United States Patent
Striker et al.

(10) Patent No.: US 9,885,287 B2
(45) Date of Patent: Feb. 6, 2018

(54) GAS TURBINE ENGINE MECHANICAL-ELECTRICAL HYBRID FUEL DELIVERY SYSTEM

(71) Applicant: HONEYWELL INTERNATIONAL INC., Morristown, NJ (US)

(72) Inventors: Don Striker, Chandler, AZ (US); Michael McPherson, Phoenix, AZ (US); Elmer Greenbank, Chandler, AZ (US); Paul W. Futa, North Liberty, IN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 723 days.

(21) Appl. No.: 14/483,955

(22) Filed: Sep. 11, 2014

(65) Prior Publication Data
US 2016/0076452 A1    Mar. 17, 2016

(51) Int. Cl.
*F02C 7/236* (2006.01)
*F02C 7/224* (2006.01)
*F02C 9/28* (2006.01)

(52) U.S. Cl.
CPC .............. *F02C 7/236* (2013.01); *F02C 7/224* (2013.01); *F02C 9/28* (2013.01); *F05D 2260/98* (2013.01); *F05D 2270/303* (2013.01); *F05D 2270/304* (2013.01)

(58) Field of Classification Search
CPC ..................... F05D 2270/303; F05D 2270/304
USPC ....................................... 60/39.281, 734–749
See application file for complete search history.

(56) References Cited

U.S. PATENT DOCUMENTS

| | | | |
|---|---|---|---|
| 4,122,667 A * | 10/1978 | Hosaka | F02C 7/26 60/39.091 |
| 5,129,221 A | 7/1992 | Walker et al. | |
| 6,442,925 B1 * | 9/2002 | Dalton | F02C 7/232 60/39.094 |
| 6,536,217 B2 | 3/2003 | Lipinski et al. | |
| 6,675,570 B2 | 1/2004 | Herbison et al. | |
| 6,971,373 B2 | 12/2005 | Mudway et al. | |
| 7,234,293 B2 | 6/2007 | Yates et al. | |
| 7,401,461 B2 | 7/2008 | Eick et al. | |
| 7,805,947 B2 | 10/2010 | Moulebhar | |
| 7,845,177 B2 | 12/2010 | Parsons | |
| 8,127,524 B2 | 3/2012 | Falke et al. | |
| 8,127,548 B2 | 3/2012 | Anson et al. | |
| 8,205,597 B2 | 6/2012 | Brocard et al. | |

(Continued)

*Primary Examiner* — Jason Shanske
*Assistant Examiner* — Jessica Kebea
(74) *Attorney, Agent, or Firm* — Lorenz & Kopf, LLP

(57) ABSTRACT

A gas turbine engine fuel delivery system includes a mechanically-driven fuel pump, an electrically-driven fuel pump, and an engine control. The mechanically-driven fuel pump is adapted to receive a drive torque from a gas turbine engine draw fuel into its fuel inlet and discharge the fuel from its fuel outlet. The electrically-driven fuel pump has a first fuel inlet/outlet that is in fluid communication with the mechanically-driven fuel pump fuel inlet, and also has a second fuel inlet/outlet. The engine control is responsive to an engine start signal to cause the electrically-driven fuel pump to be temporarily energized to pump fuel from the first fuel inlet/outlet to the second fuel inlet/outlet, and is responsive to an engine shutdown signal to cause the electrically-driven pump to be temporarily energized to pump fuel from the second fuel inlet/outlet to the first fuel inlet/outlet.

18 Claims, 2 Drawing Sheets

(56) References Cited

U.S. PATENT DOCUMENTS

| | | |
|---|---|---|
| 8,234,875 B2 | 8/2012 | Falke et al. |
| 8,276,360 B2 * | 10/2012 | Poisson .................. F01D 19/00 |
| | | 60/39.281 |
| 8,302,406 B2 | 11/2012 | Baker |
| 8,312,863 B2 * | 11/2012 | Ibrahim .................... F01N 9/00 |
| | | 123/446 |
| 8,418,964 B2 | 4/2013 | LeBlanc et al. |
| 2005/0217236 A1 * | 10/2005 | Wernberg ............... F02C 7/232 |
| | | 60/39.281 |
| 2005/0284149 A1 * | 12/2005 | Jansen ...................... F02C 7/14 |
| | | 60/734 |
| 2007/0245744 A1 * | 10/2007 | Dooley .................. F01D 21/06 |
| | | 60/772 |
| 2009/0235631 A1 | 9/2009 | Bocquet et al. |
| 2010/0293919 A1 | 11/2010 | Poisson et al. |
| 2011/0023444 A1 | 2/2011 | Veilleux, Jr. |
| 2013/0192679 A1 * | 8/2013 | Ripley ................... F02C 7/236 |
| | | 137/2 |
| 2016/0084272 A1 * | 3/2016 | Mueller .................. F15B 11/02 |
| | | 60/445 |
| 2016/0201564 A1 * | 7/2016 | Oba ........................ F02C 7/236 |
| | | 137/565.3 |

* cited by examiner

GAS TURBINE ENGINE MECHANICAL-ELECTRICAL HYBRID FUEL DELIVERY SYSTEM

TECHNICAL FIELD

The present invention generally relates to a gas turbine engine fuel delivery system, and more particularly relates to a gas turbine engine mechanical-electrical hybrid fuel delivery system.

BACKGROUND

Typical gas turbine engine fuel supply systems include a fuel source, such as a fuel tank, and a main fuel pump that receives fuel drawn from the fuel source and delivers pressurized fuel to the fuel manifolds in the engine combustor via a fuel supply line. The main fuel pump is typically implemented using a positive displacement pump that is driven directly by the engine gearbox. Thus, the fuel flow supplied by the main fuel pump is proportional to engine speed.

The fixed displacement of a main fuel pump is typically sized to produce the fuel flow that is needed to run the engine at a maximum demand case, which is typically during engine start-up, where engine speed is relatively low, or during takeoff, where fuel demand is relatively high. As such, at other operating conditions, such as idle or high altitude cruise, the main fuel pump supplies much more fuel than the engine needs.

The known fuel supply systems described above generally operate safely and robustly, but can exhibit certain drawbacks. For example, the overcapacity of the main fuel pump results in increased horsepower extraction, which increases engine fuel consumption. This overcapacity also increases the overall fuel temperature within the fuel supply system.

Hence, there is a need for a gas turbine engine fuel supply system that reduces fuel pumping overcapacity and leads to a decrease in overall engine fuel consumption and overall fuel temperature. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a gas turbine engine fuel delivery system includes a fuel supply line, a mechanically-driven fuel pump, an electrically-driven fuel pump, and an engine control. The fuel supply line is configured to supply fuel to one or more gas turbine engine fuel manifolds. The mechanically-driven fuel pump has a fuel inlet and a fuel outlet. The mechanically-driven fuel pump is adapted to receive a drive torque from a gas turbine engine and is configured, upon receipt of the drive torque, to draw fuel into its fuel inlet and discharge the fuel from its fuel outlet for supply to the fuel supply line. The electrically-driven fuel pump has a first fuel inlet/outlet and a second fuel inlet/outlet. The first fuel inlet/outlet is in fluid communication with the mechanically-driven fuel pump fuel inlet. The electrically-driven fuel pump is configured to be selectively energized to pump fuel either from the first fuel inlet/outlet to the second fuel inlet/outlet for supply to the fuel supply line, or from the second fuel inlet/outlet to the first fuel inlet/outlet. The engine control is adapted to selectively receive an engine start signal and an engine shutdown signal. The engine control is responsive to the engine start signal to cause the electrically-driven fuel pump to be temporarily energized to pump fuel from the first fuel inlet/outlet to the second fuel inlet/outlet, and is responsive to the engine shutdown signal to cause the electrically-driven pump to be temporarily energized to pump fuel from the second fuel inlet/outlet to the first fuel inlet/outlet.

In another embodiment, a gas turbine engine fuel delivery system includes a fuel supply line, a mechanically-driven fuel pump, an electrically-driven fuel pump, a check valve, and an engine control. The fuel supply line is configured to supply fuel to one or more gas turbine engine fuel manifolds. The mechanically-driven fuel pump has a fuel inlet and a fuel outlet. The mechanically-driven fuel pump is adapted to receive a drive torque from a gas turbine engine and is configured, upon receipt of the drive torque, to draw fuel into its fuel inlet and discharge the fuel from its fuel outlet for supply to the fuel supply line. The electrically-driven fuel pump has a first fuel inlet/outlet and a second fuel inlet/outlet. The first fuel inlet/outlet is in fluid communication with the mechanically-driven fuel pump fuel inlet. The electrically-driven fuel pump is configured to be selectively energized to pump fuel either from the first fuel inlet/outlet to the second fuel inlet/outlet for supply to the fuel supply line, or from the second fuel inlet/outlet to the first fuel inlet/outlet. The check valve is disposed between the second fuel inlet/outlet and the fuel supply line for preventing fuel from flowing from the fuel supply line into the electrically-driven fuel pump fuel outlet. The engine control is adapted to selectively receive an engine start signal and an engine shutdown signal. The engine control is configured to cause the electrically-driven fuel pump to be energized to pump fuel from the first fuel inlet/outlet to the second fuel inlet/outlet upon receipt of the engine start signal, determine that a predetermined engine condition exists during startup of the gas turbine engine, cause the electrically-driven fuel pump to be de-energized in response to determining that the predetermined event has occurred, and cause the electrically-driven pump to be temporarily energized to pump fuel from the second fuel inlet/outlet to the first fuel inlet/outlet upon receipt of the engine shutdown signal.

In yet another embodiment, a gas turbine engine system includes a gas turbine engine, a fuel supply line, a mechanically-driven fuel pump, an electrically-driven fuel pump, and an engine control. The gas turbine engine includes one or more fuel manifolds. The fuel supply line is configured to supply fuel to the one or more fuel manifolds. The mechanically-driven fuel pump has a fuel inlet and a fuel outlet. The mechanically-driven fuel pump is adapted to receive a drive torque from the gas turbine engine and is configured, upon receipt of the drive torque, to draw fuel into its fuel inlet and discharge the fuel from its fuel outlet for supply to the fuel supply line. The electrically-driven fuel pump has a first fuel inlet/outlet and a second fuel inlet/outlet. The first fuel inlet/outlet is in fluid communication with the mechanically-driven fuel pump fuel inlet. The electrically-driven fuel pump is configured to be selectively energized to pump fuel either from the first fuel inlet/outlet to the second fuel inlet/outlet for supply to the fuel supply line, or from the second fuel inlet/outlet to the first fuel inlet/outlet. The engine control is adapted to selectively receive an engine start signal and an engine shutdown signal. The engine control is responsive to the engine start signal to cause the electrically-driven fuel pump to be temporarily energized to pump fuel from the first fuel inlet/outlet to the second fuel inlet/outlet, and is responsive to the engine shutdown signal to cause the electrically-driven pump to be temporarily energized to pump fuel from the second fuel inlet/outlet to the first fuel inlet/outlet.

Furthermore, other desirable features and characteristics of the fuel delivery system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
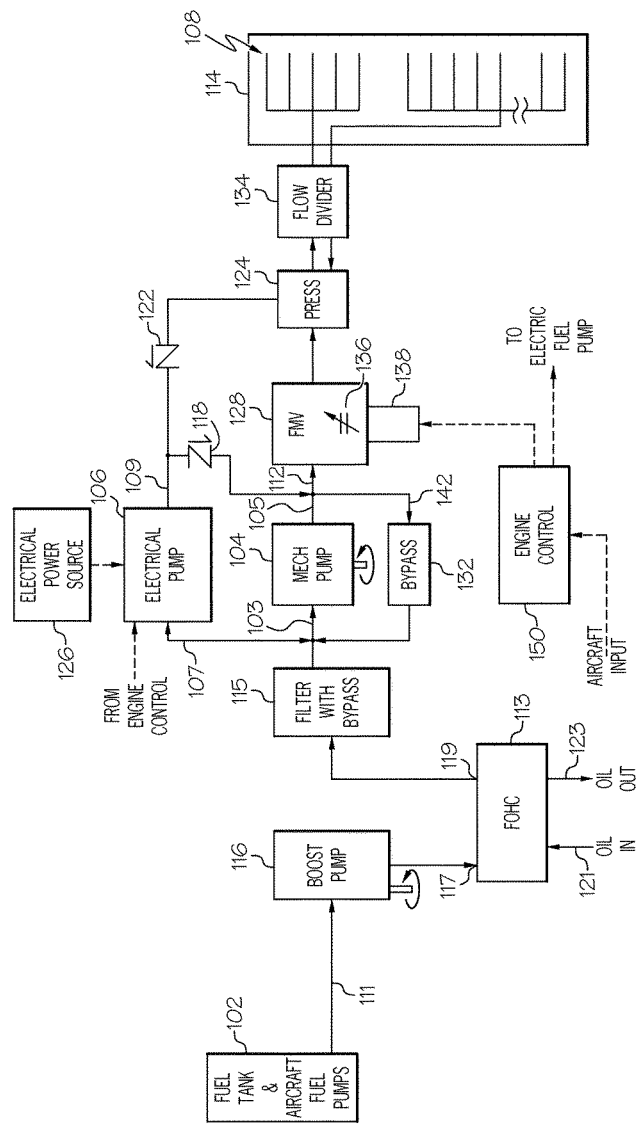
FIG. 1 depicts a simplified schematic diagram of an exemplary embodiment of a gas turbine engine mechanical-electrical hybrid fuel delivery system.

A simplified schematic diagram of one embodiment of an exemplary embodiment of a gas turbine engine mechanical-electrical hybrid fuel delivery system is depicted in FIG. 1. The depicted system 100 includes a fuel source 102, a mechanically-driven fuel pump 104, an electrically-driven fuel pump 106, and an engine control 150. The fuel source 102, which is preferably implemented as one or more tanks, stores fuel that is to be supplied, via a fuel feed line 111 and a fuel supply line 112, to one or more fuel loads 108. It will be appreciated that the number and type of fuel loads 108 may vary. For example, the system 100 may include one or more servo-fuel loads and one or more burn-fuel loads. For simplicity, only a burn-fuel load is depicted in FIG. 1, and this fuel load is one or more fuel manifolds 108 in a gas turbine engine 114.

The mechanically-driven fuel pump 104 includes a fuel inlet 103 and a fuel outlet 105, and is mechanically coupled to receive a drive torque from the gas turbine engine 114. The mechanically-driven fuel pump 104 is configured, upon receipt of the drive torque, to draw fuel into its fuel inlet 103 and discharge the fuel from its fuel outlet 105 for supply to the fuel supply line 112. It will be appreciated that mechanically-driven fuel pump 104 may be variously configured and implemented. For example, the mechanically-driven fuel pump 104 may be a positive displacement piston, gear, or vane pump. In one particular embodiment, the mechanically-driven fuel pump 104 is implemented as a fixed displacement pump.

As FIG. 1 also depicts, the system 100 preferably includes a boost pump 116, such as a relatively low horsepower centrifugal pump. The boost pump 116 draws fuel directly from the fuel source 102 and provides sufficient suction head for the mechanically-driven fuel pump 104 and/or electrically-driven fuel pump 106. The boost pump 116 may be either mechanically driven by the gas turbine engine 108, or electrically driven by a non-illustrated motor. Although not depicted, it will be appreciated that the system 100 may additionally include a low pressure pump within the fuel tank(s) 102 to supply fuel to the boost pump 104. Moreover, the boost pump 116 may, in some embodiments, not be included.

In the depicted embodiment, the system 100 additionally includes a fuel heater/oil cooler (FHOC) 113 and a filter 115. The FHOC 113 and filter 115 are disposed between the boost pump 116 and the mechanically-driven fuel pump 104 and electrically-driven fuel pump 106. The FHOC 113, in addition to including a fuel inlet 117 and a fuel outlet 119, includes an oil inlet 121 and an oil outlet 123. The FHOC 113 is configured to transfer heat between the fuel and oil that flows into the oil inlet 121 and out the oil outlet 123. More specifically, during system operation heat is preferably transferred from the oil to the fuel, thereby cooling the oil and heating the fuel. It will be appreciated that in some embodiments, the system 100 may be implemented without the FHOC 113 and/or the filter 115.

The electrically-driven fuel pump 106 is a reversible pump and includes a first fuel inlet/outlet 107 and a second fuel inlet/outlet 109. The first fuel inlet/outlet 107 is in fluid communication, via a first check valve 118 and the supply line 112, with the mechanically-driven fuel pump fuel inlet 103. The second fuel inlet/outlet 109 is in fluid communication, via a second check valve 122, with a pressurizing valve 124 (described further below). The electrically-driven fuel pump 106 is configured to be selectively energized, via an electric power source 126, to pump fuel in either a first direction or a second direction. More specifically, from the first fuel inlet/outlet 107 to the second fuel inlet/outlet 109 for supply to the fuel supply line 112, or from the second fuel inlet/outlet 109 to the first fuel inlet/outlet 107.

Before proceeding further, it is noted that the depicted fuel delivery system 100 additionally includes a fuel metering valve 128, a bypass valve 132, the above-mentioned pressurizing valve 124, and a flow divider valve 134. The fuel metering valve 128 is disposed on the fuel supply line 112 downstream of the mechanically-driven fuel pump fuel outlet 105 and the electrically-driven pump first fuel inlet/outlet 107. The fuel metering valve 128 includes a variable area flow orifice 136 through which a portion of the fuel in the fuel supply line 112 flows. A valve control device 138 may be used to adjust the position of the metering valve 108, and thus the area of the variable area flow orifice 136. It will be appreciated that the fuel metering valve 128 and the valve control device 138 may be implemented using any one of numerous types of components. For example, the fuel metering valve 128 could be an electrically operated valve, a hydraulically-operated valve, or a pneumatic valve. Moreover, the valve control device 138 may be implemented as an electro-hydraulic servo valve (EHSV), an electric motor, or an independent controller, just to name a few. In any case, fuel flow rate to the gas turbine engine 108 is, under normal circumstances, controlled by adjusting the position of the fuel metering valve 128, and thus the area of the variable area flow orifice 136, via commands supplied from the engine control 150.

The bypass valve 132 is disposed on a bypass flow line 142 that is connected to the fuel supply line 112 between the mechanically-driven pump fuel outlet 105 and the fuel metering valve 128. The bypass valve 128 is configured, in response to pressure upstream and downstream pressure of the fuel metering valve 128, to selectively divert fuel flow in the fuel supply line 112 away from the fuel metering valve 128, to maintain a constant head or pressure drop across the fuel metering valve 128.

The pressurizing valve 124 is disposed on fuel supply line 112 downstream of the fuel metering valve 128, and is configured to maintain a reference pressure downstream of the fuel metering valve 128. The flow divider valve 134 is disposed on the fuel supply line 112 downstream of the pressurizing valve 124 and is configured to selectively direct fuel in one of two directions—either from the pressurizing valve 124 to the one or more gas turbine engine fuel manifolds 108 or from the one or more gas turbine engine fuel manifolds 108 to the electrically-driven fuel pump second fuel inlet/outlet 109.

The engine control 150, which may be implemented within an engine controller, such as a Full Authority Digital Engine Controller (FADEC) or other electronic engine controller (EEC), controls the flow of fuel to the gas turbine engine fuel manifolds 108 during engine start and run operations, and the flow of fuel from the gas turbine engine fuel manifolds 108 during engine shutdown operations. To do so, the engine control 150 receives various input signals and controls the operation of at least the electrically-driven pump 106 and the fuel metering valve 128. In the depicted embodiment, the engine control 150 is adapted to receive at least an engine start signal, an engine shutdown signal, and engine speed command signals from non-illustrated control equipment in, for example, a non-illustrated cockpit.

Before proceeding further, it should be noted that the engine speed command signals are supplied to the engine control after the gas turbine engine 108 is started, and before the gas turbine engine 108 is shutdown. The operation of the engine control 150 in response to the engine speed command signals is not pertinent to the instant disclosure, and will therefore not be further described. The operation of the engine control 150 in response to the startup and shutdown signals will, however, be now described.

The engine control 150 is responsive to the engine start signal to cause the electrically-driven fuel pump 106 to be temporarily energized to pump fuel from the first fuel inlet/outlet 107 to the second fuel inlet/outlet 109. More specifically, the engine control 150, upon receipt of the engine start signal, causes the electrically-driven fuel pump 106 to be energized, via the electric power source 126, to pump fuel from the first fuel inlet/outlet 107 to the second fuel inlet/outlet 109 until a predetermined engine condition exists during the startup of the gas turbine engine 108. It may thus be appreciated that the engine control 150 is additionally configured to determine when the predetermined engine condition exists. In response to determining that the predetermined engine condition exists, the engine control 150 then causes the electrically-driven fuel pump 106 to be de-energized.

The predetermined engine condition is that the gas turbine engine 108 is running operating at a point where the mechanically-driven fuel pump 104 is sufficient to complete the engine start operations. There are various engine parameters that may be used to indicate that the predetermined engine condition exists. Some non-limiting examples include a predetermined gas turbine engine rotational speed, a predetermined gas turbine engine temperature, just to name a few. It will additionally be appreciated that the engine control 150 may be variously configured to determine that the predetermined engine condition exists during the startup. In the depicted embodiment, the engine control 150 is coupled to receive a signal representative of the predetermined engine condition.

The engine control 150 is responsive to the engine shutdown signal to cause the electrically-driven pump 106 to be temporarily energized, via the electric power source 126, to pump fuel from the second fuel inlet/outlet 109 to the first fuel inlet/outlet 107. In doing so, the electrically-driven fuel pump 106 extracts fuel from the fuel manifolds 108, via the flow divider valve 134, the pressurizing valve 124, and the second check valve 122, during engine shutdown. Preferably, only a predetermined amount of fuel is extracted, so the engine control 150 is configured to cause the electrically-driven pump 106 to be energized for a time period that will extract the predetermined amount of fuel.

Figure 2:
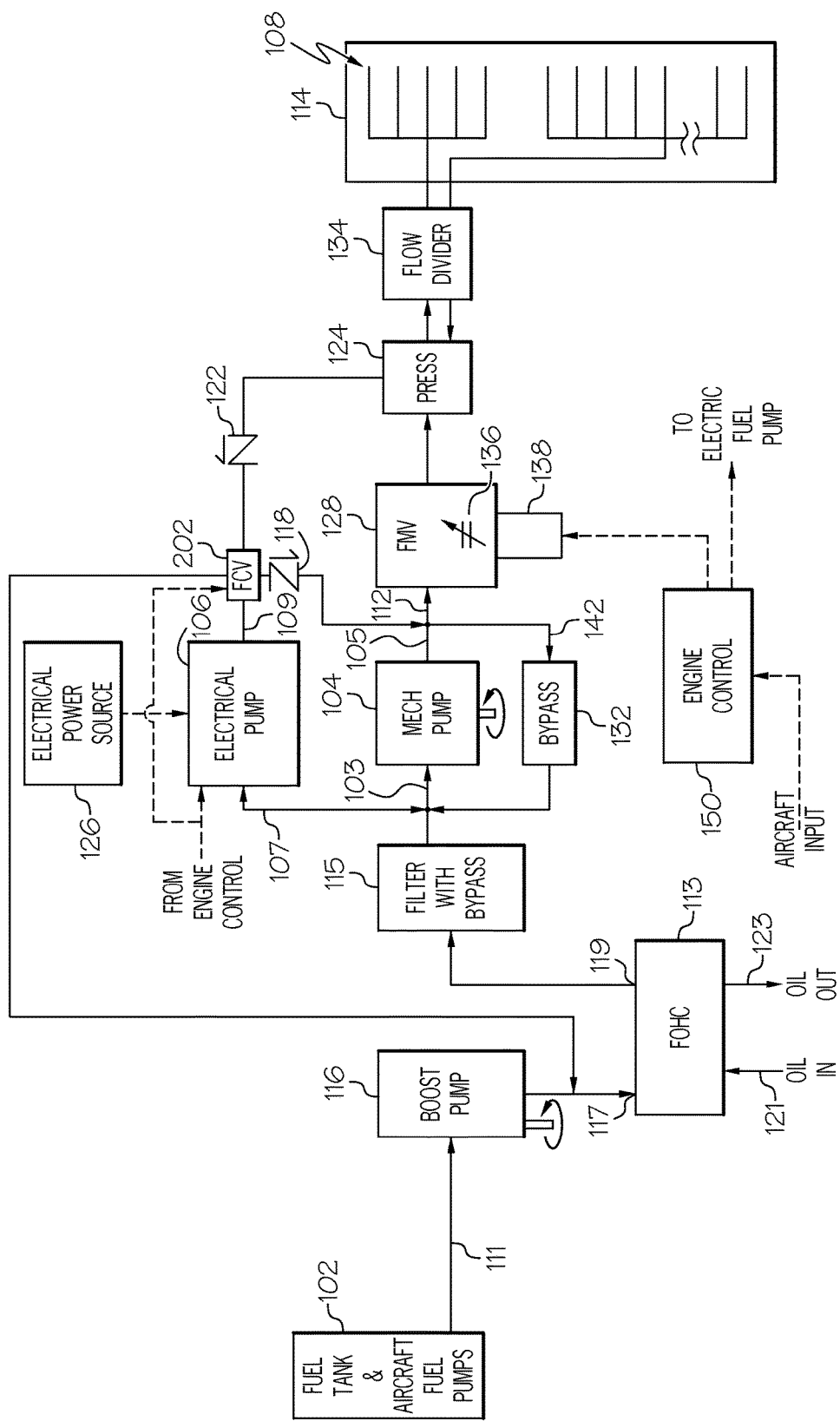
FIG. 2 depicts a simplified schematic diagram of an exemplary alternative embodiment of a gas turbine engine mechanical-electrical hybrid fuel delivery system.

In an alternate embodiment, which is depicted in FIG. 2, the system 100 additionally includes a flow control valve 202. The flow control valve 202 is disposed between the second fuel inlet/outlet 109, the first check valve 118, and the second check valve 122, and is movable between a first position and a second position. The flow control valve 202 is responsive to a command from the engine control 150 to move from the first position, in which fuel discharged from the second fuel inlet/outlet 109 is directed into and through the first check valve 118, to the second position, in which fuel is directed through a continuous closed loop—from the second fuel inlet/outlet 109, into and through the FHOC 113, and back to the first fuel inlet/outlet port 107. Preferably, prior to, or upon initiation of, engine start on a cold day, the electrically-driven fuel pump 106 will direct fuel through this continuous closed loop for a predetermined time. The work put into the fuel would result in heating the fuel. As is generally known, heating the fuel prior to start on cold days may provide better light off performance. Moreover, running fuel through the FHOC 113 and filter 115 instead of just a bypass loop provides a larger volume of fuel to heat, and reduces the potential of icing in the FHOC 113 and filter 115.

With the embodiment depicted in FIG. 2, the engine control 150, upon receipt of the engine start signal, causes the electrically-driven fuel pump 106 to be energized, via the electric power source 126, to pump fuel from the first fuel inlet/outlet 107 to the second fuel inlet/outlet 109. The engine control 150 will additionally supply a command to the flow control valve 202 that causes the flow control valve 202 to move to the second position. Thus, fuel discharged from the second fuel inlet/outlet 109 is directed into the fuel inlet 117 of the FHOC 113. After the predetermined time, the engine control 150 will then cause the flow control valve to move to the first position. As such, fuel discharged from the second fuel inlet/outlet 109 is directed into and through the first check valve 118 until the predetermined engine condition exists during the startup of the gas turbine engine 108. In response to determining that the predetermined engine condition exists, the engine control 150 then causes the electrically-driven fuel pump 106 to be de-energized.

As with the embodiment of FIG. 1, the engine control 150 of the alternate embodiment of FIG. 2 is responsive to the engine shutdown signal to cause the electrically-driven pump 106 to be temporarily energized, via the electric power source 126, to pump fuel from the second fuel inlet/outlet 109 to the first fuel inlet/outlet 107, and does so without repositioning the flow control valve 202. Thus, the electrically-driven fuel pump 106 extracts fuel from the fuel manifolds 108, via the flow divider valve 134, the pressurizing valve 124, the second check valve 122, and the flow control valve 202, during engine shutdown. Preferably, only a predetermined amount of fuel is extracted, so the engine control 150 is configured to cause the electrically-driven pump 106 to be energized for a time period that will extract the predetermined amount of fuel.

The mechanically-driven fuel pump 104 and the electrically-driven fuel pump 106 are sized such that together these pumps 104, 106 produce the fuel flow that is needed to run the gas turbine engine 108 at the maximum demand case (e.g., engine startup). The mechanically-driven fuel pump 104 is sized that that at other operating conditions, it alone can produce the fuel flow the gas turbine engine 108 needs.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine fuel delivery system, comprising:
   a fuel supply line configured to supply fuel to one or more gas turbine engine fuel manifolds;
   a mechanically-driven fuel pump having a fuel inlet and a fuel outlet, the mechanically-driven fuel pump adapted to receive a drive torque from a gas turbine engine and configured, upon receipt of the drive torque, to draw fuel into its fuel inlet and discharge the fuel from its fuel outlet for supply to the fuel supply line;
   an electrically-driven fuel pump having a first fuel inlet/outlet and a second fuel inlet/outlet, the first fuel inlet/outlet in fluid communication with the mechanically-driven fuel pump fuel inlet, the electrically-driven fuel pump configured to be selectively energized to pump fuel either (i) from the first fuel inlet/outlet to the second fuel inlet/outlet for supply to the fuel supply line or (ii) from the second fuel inlet/outlet to the first fuel inlet/outlet;
   a first check valve disposed between the second fuel inlet/outlet and the fuel supply line for preventing fuel from flowing from the fuel supply line into the second fuel inlet/outlet; and
   an engine controller adapted to selectively receive an engine start signal and an engine shutdown signal, the engine controller responsive to:
      (i) the engine start signal to cause the electrically-driven fuel pump to be temporarily energized to pump fuel from the first fuel inlet/outlet to the second fuel inlet/outlet, and
      (ii) the engine shutdown signal to cause the electrically-driven pump to be temporarily energized to pump fuel from the second fuel inlet/outlet to the first fuel inlet/outlet.

2. The system of claim 1, wherein the engine control controller is configured to:
   cause the electrically-driven fuel pump to be energized upon receipt of the engine start signal;
   determine that a predetermined engine condition exists during startup of the gas turbine engine; and
   cause the electrically-driven fuel pump to be de-energized in response to determining that the predetermined engine condition has occurred.

3. The system of claim 2, wherein the predetermined engine condition comprises a predetermined gas turbine engine rotational speed.

4. The system of claim 2, wherein the predetermined engine condition comprises a predetermined gas turbine engine temperature.

5. The system of claim 2, wherein the engine controller is adapted to receive a signal representative of the predetermined engine condition.

6. The system of claim 1, further comprising:
   a flow control valve disposed downstream of the second fuel inlet/outlet and moveable between a first position, in which fuel discharged from the second fuel inlet/outlet is directed into and through the first check valve, and a second position, in which fuel is directed through a continuous closed loop back into the first fuel inlet/outlet.

7. The system of claim 6, further comprising:
   a fuel heater/oil cooler disposed upstream of the mechanically-driven fuel pump and the electrically-driven fuel pump and is flow communication with the flow control valve, such that the fuel heater/oil cooler forms part of the continuous closed loop.

8. The system of claim 1, further comprising:
   a fuel metering valve disposed on the fuel supply line downstream of the mechanically-driven fuel pump outlet and the second fuel inlet/outlet;
   a pressurizing valve disposed on fuel supply line and configured to maintain a reference pressure downstream of the fuel metering valve; and
   a flow divider valve disposed on the fuel supply line downstream of the pressurizing valve and configured to selectively direct fuel either (i) from the pressurizing valve to the one or more gas turbine engine fuel manifolds or (ii) from the one or more gas turbine engine fuel manifolds to the second fuel inlet/outlet.

9. The system of claim 8, further comprising:
a second check valve disposed between the flow divider valve and the second fuel inlet/outlet for preventing fuel from flowing from the second fuel inlet/outlet to the flow divider valve.

10. A gas turbine engine fuel delivery system, comprising:
a fuel supply line configured to supply fuel to one or more gas turbine engine fuel manifolds;
a mechanically-driven fuel pump having a fuel inlet and a fuel outlet, the mechanically-driven fuel pump adapted to receive a drive torque from a gas turbine engine and configured, upon receipt of the drive torque, to draw fuel into its fuel inlet and discharge the fuel from its fuel outlet for supply to the fuel supply line;
an electrically-driven fuel pump having a first fuel inlet/outlet and a second fuel inlet/outlet, the first fuel inlet/outlet in fluid communication with the mechanically-driven fuel pump fuel inlet, the electrically-driven fuel pump configured to be selectively energized to pump fuel either (i) from the first fuel inlet/outlet to the second fuel inlet/outlet for supply to the fuel supply line or (ii) from the second fuel inlet/outlet to the first fuel inlet/outlet;
a first check valve disposed between the second fuel inlet/outlet and the fuel supply line for preventing fuel from flowing from the fuel supply line into the second fuel inlet/outlet; and
an engine controller adapted to selectively receive an engine start signal and an engine shutdown signal, the engine controller configured to:
  (i) cause the electrically-driven fuel pump to be energized to pump fuel from the first fuel inlet/outlet to the second fuel inlet/outlet upon receipt of the engine start signal,
  (ii) determine that a predetermined engine condition exists during startup of the gas turbine engine,
  (iii) cause the electrically-driven fuel pump to be de-energized in response to determining that the predetermined engine condition has occurred, and
  (iv) cause the electrically-driven pump to be temporarily energized to pump fuel from the second fuel inlet/outlet to the first fuel inlet/outlet upon receipt of the engine shutdown signal.

11. The system of claim 10, wherein the predetermined engine condition comprises a predetermined gas turbine engine rotational speed.

12. The system of claim 10, wherein the predetermined engine condition comprises a predetermined gas turbine engine temperature.

13. The system of claim 10, wherein the engine controller is adapted to receive a signal representative of the predetermined engine condition.

14. The system of claim 10, further comprising:
a flow control valve disposed downstream of the second fuel inlet/outlet and moveable between a first position, in which fuel discharged from the second fuel inlet/outlet is directed into and through the check valve, and a second position, in which fuel is directed through a continuous closed loop back into the first fuel inlet/outlet.

15. The system of claim 14, further comprising:
a fuel heater/oil cooler disposed upstream of the mechanically-driven fuel pump and the electrically-driven fuel pump and is flow communication with the flow control valve, such that the fuel heater/oil cooler forms part of the continuous closed loop.

16. The system of claim 10, further comprising:
a fuel metering valve disposed on the fuel supply line downstream of the mechanically-driven fuel pump outlet and the second fuel inlet/outlet;
a pressurizing valve disposed on fuel supply line and configured to maintain a reference pressure downstream of the fuel metering valve; and
a flow divider valve disposed on the fuel supply line downstream of the pressurizing valve and configured to selectively direct fuel either (i) from the pressurizing valve to the one or more gas turbine engine fuel manifolds or (ii) from the one or more gas turbine engine fuel manifolds to the second fuel inlet/outlet.

17. The system of claim 16, further comprising:
a second check valve disposed between the flow divider valve and the second fuel inlet/outlet for preventing fuel from flowing from the second fuel inlet/outlet to the flow divider valve.

18. A gas turbine engine fuel delivery system, comprising:
a fuel supply line configured to supply fuel to one or more gas turbine engine fuel manifolds;
a mechanically-driven fuel pump having a fuel inlet and a fuel outlet, the mechanically-driven fuel pump adapted to receive a drive torque from a gas turbine engine and configured, upon receipt of the drive torque, to draw fuel into its fuel inlet and discharge the fuel from its fuel outlet for supply to the fuel supply line;
an electrically-driven fuel pump having a first fuel inlet/outlet and a second fuel inlet/outlet, the first fuel inlet/outlet in fluid communication with the mechanically-driven fuel pump fuel inlet, the electrically-driven fuel pump configured to be selectively energized to pump fuel either (i) from the first fuel inlet/outlet to the second fuel inlet/outlet for supply to the fuel supply line or (ii) from the second fuel inlet/outlet to the first fuel inlet/outlet;
a fuel metering valve disposed on the fuel supply line downstream of the mechanically-driven fuel pump outlet and the second fuel inlet/outlet;
a pressurizing valve disposed on fuel supply line and configured to maintain a reference pressure downstream of the fuel metering valve; and
a flow divider valve disposed on the fuel supply line downstream of the pressurizing valve and configured to selectively direct fuel either (i) from the pressurizing valve to the one or more gas turbine engine fuel manifolds or (ii) from the one or more gas turbine engine fuel manifolds to the second fuel inlet/outlet;
a check valve disposed between the flow divider valve and the second fuel inlet/outlet for preventing fuel from flowing from the second fuel inlet/outlet to the flow divider valve; and
an engine controller adapted to selectively receive an engine start signal and an engine shutdown signal, the engine controller responsive to:
  (i) the engine start signal to cause the electrically-driven fuel pump to be temporarily energized to pump fuel from the first fuel inlet/outlet to the second fuel inlet/outlet, and
  (ii) the engine shutdown signal to cause the electrically-driven pump to be temporarily energized to pump fuel from the second fuel inlet/outlet to the first fuel inlet/outlet.

* * * * *